Sept. 27, 1966 — R. L. HANDY — 3,274,783
METHOD OF STOPPING LANDSLIDES AND SOIL SHEAR FAILURES
Filed Jan. 10, 1964 — 2 Sheets-Sheet 1
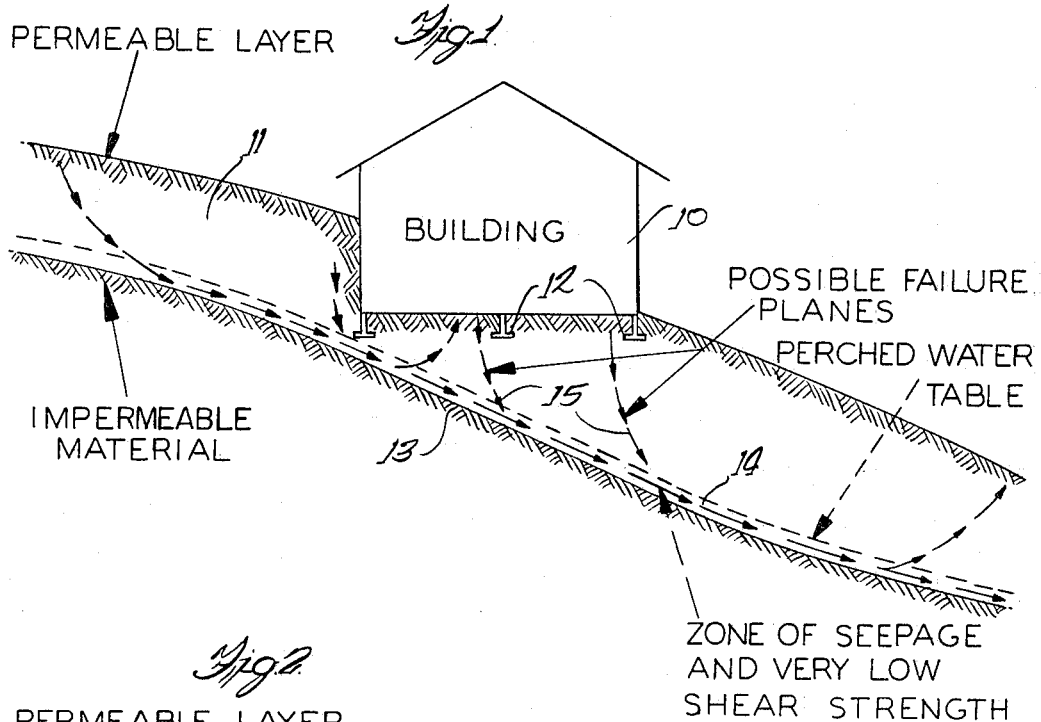
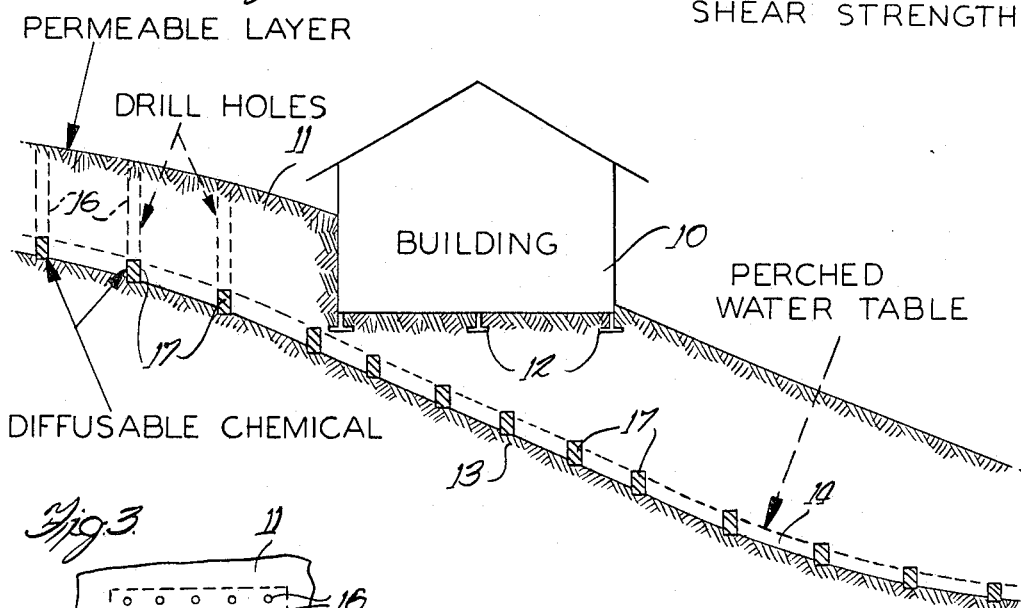
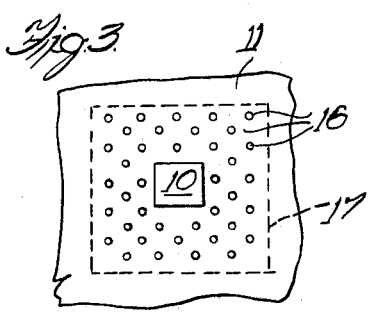
Inventor
Richard L. Handy
Dawson, Tilton, Fallon,
Lungmus & Alexander
Attorneys

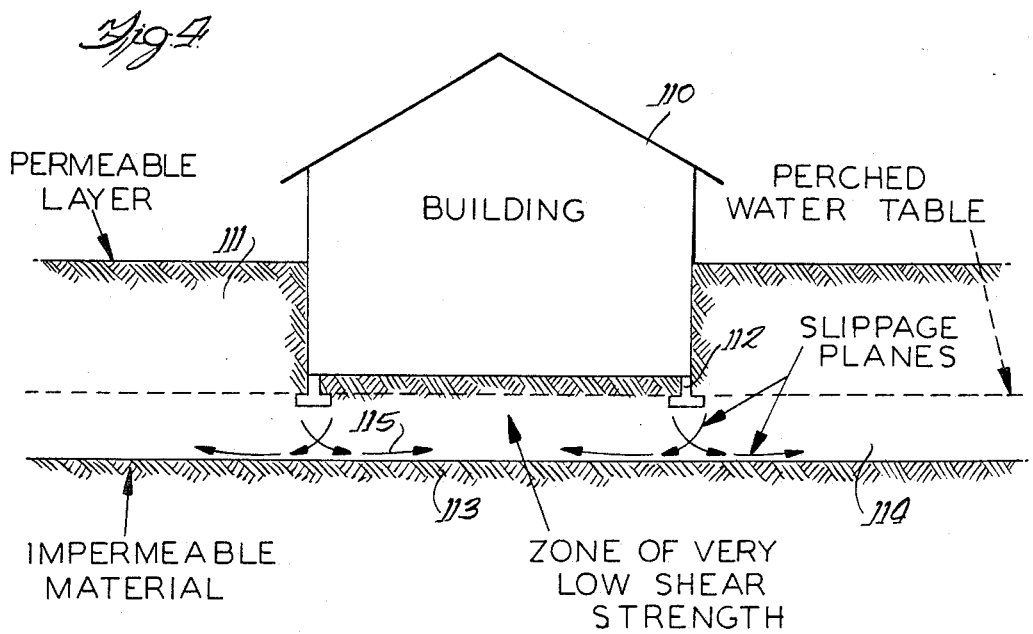
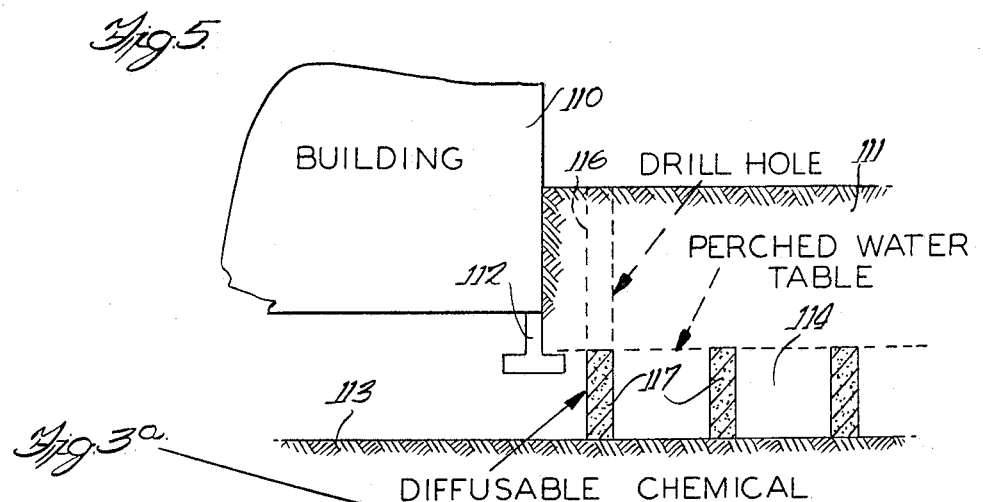
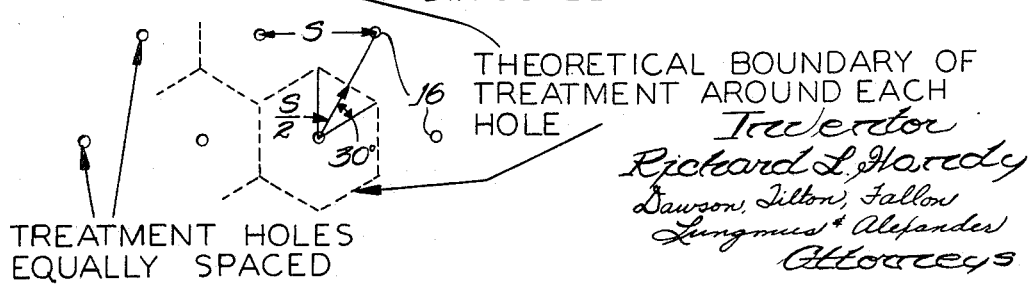

United States Patent Office 3,274,783
Patented Sept. 27, 1966

3,274,783
METHOD OF STOPPING LANDSLIDES AND SOIL SHEAR FAILURES
Richard L. Handy, Ames, Iowa, assignor to Soil Technical Associates, Inc., Des Moines, Iowa, a corporation of Iowa
Filed Jan. 10, 1964, Ser. No. 336,941
6 Claims. (Cl. 61—35)

This invention relates to a method of stopping landslides and soil shear failures. More particularly, the method of this invention is applicable to the stopping of landslides and soil shear failures of soil which contains a substantial percentage of montmorillonitic clay and because of its position overlying an impermeable soil stratum, is substantially saturated with water.

Subsurface montmorillonitic soil strata are a major source of landslides and soil shear failures. Such soil strata, when wet, have relatively little strength because of the very low internal coefficient of friction. Montmorillonitic clay has a substantially zero coefficient of friction, its shearing strength depending mainly on the amount of internal ionic cohesion. Saturation with water decreases ionic cohesion, and consequently a soil stratum containing as little as 10% by weight of montmorillonitic clay will be appreciably weaker when wet.

The problem caused by subsurface montmorillonitic soil strata is particularly acute where the potentially weak stratum overlies a relatively water-impermeable stratum. This will result in a condition known as a "perched" water table. Where such a perched water table exists, and the condition is a very common one, the subsurface montmorillonitic soil stratum will be saturated with water, and thereby will have minimal structural strength. When the weight on the overlying surface layers of the soil is increased, such as by the construction of a building, slippage can readily occur within the weak, saturated clayey soil stratum, with resultant damage to the building. The tendency toward slippage of the stratum containing the perched water table is increased where the underlying impermeable strata has a downward incline or slope, and this condition generates what is typically referred to as a landslide. Similar soil shear failures of a less extensive nature can also occur where the impermeable stratum and water table-containing stratum are relatively flat. Slippage planes created within the saturated montmorillonitic clay stratum permit the surface layers to shift laterally, thereby in effect creating small scale landslides.

Heretofore, the problems discussed above have not been satisfactorily solved. The available means for attempting to prevent or arrest landslides are generally rather ineffective, and at best can only be applied in certain special situations. One approach is to provide increased drainage for the perched water table stratum, but it is usually impossible to completely eliminate the perched water table or to even control its extent during the spring or other rainy seasons of the year. Another approach is to employ excavation or fill to change the loading on the soil area subject to landslides. This may require considerable earth movement, as to where it is necessary to flatten an extended slope, or to add an earth fill near the bottom of such a slope, and therefore this approach may be very expensive.

It is, therefore, a general object of the present invention to provide an improved method for stopping landslides and soil shear failures in sub-surface montmorillonitic soil strata, and especially where the clayey strata are permanently saturated due to a perched water table, as occurs when a clayey stratum overlies a relatively impermeable stratum. Further objects and advantages will be indicated in the following detailed specification.

The present invention involves the recognition of the specific cause of slides and shear failures of land overlying a saturated, subsurface montmorillonitic soil stratum. It is known that the strength of such stratum can be increased by water drainage, since montmorillonitic soil has a greater strength when dry than when saturated. It is also known that its strength can be increased by mechanically mixing in a cementing agent, although this procedure is inapplicable to saturated subsurface montmorillonitic soil strata. As further distinguished from such procedures, the present invention is directed to the diffusion into the perched water table stratum of a chemical agent which in itself has little or no cementing action, at least not in the concentrations employed, and which instead favorably alters the frictional resistance of the montmorillonitic soil even while it remains saturated with water. The presence of water in the strata in fact is advantageously utilized to promote the diffusion of the chemical.

This invention is also based on the further discovery that ordinary hydrated lime is highly effective for increasing the mechanical strength of saturated montmorillonitic clay strata when it is diffused into the strata at relatively low concentrations. This result is quite surprising, since montmorillonitic clays in nature are commonly in their calcium form, and, in fact, the ion exchange sites of such clays are frequently fully saturated with calcium ions. Introduction of more calcium through the lime diffusion procedure would not have been thought to be of any particular advantage unless the amount of lime employed was so great that a cementing type action was obtained. Apparently, the diffusion of a small amount of lime into the saturated montmorillonitic soil strata achieves the new result of this invention by producing an alteration of the aggregate or granular structure of the soil in the strata. More specifically, the shear resistance of the soil strata is believed to be increased due to additional flocculation of the montmorillonitic clay particles, which gives the soil a more granular texture, and thereby increases the coefficient of internal friction. Since frictional resistance is proportional in normal function, and the weight of the soil above the shear zone is tremendous, a very slight increase in the clay coefficient of friction will bring into play a vast amount of friction.

The method of the present invention is believed to have a further unexpected result or advantage. The alteration of the granular structure of the montmorillonitic soil should tend to increase its permeability to water. This can lead to better drainage in the water table zone, and may lead to reduction in the extent or thickness of the perched water table. As indicated, however, the primary effect achieved is through the favorable alteration of the coefficient of friction, which comes into play even though the soil strata remain saturated with water.

The method of the present invention is illustrated by the accompanying drawings, in which—

FIGURE 1 is a diagrammatic illustration of a condition in which landslides may readily occur where a building is constructed on a slope with underlying sloping stratum;

FIG. 2 is a diagrammatic illustration similar to FIG. 1 showing how the method of this invention can be applied to correct the landslide condition;

FIGS. 3 and 3a are fragmentary views of portions of the surface of the ground in FIG. 2 illustrating an arrangement of the bore holes.

FIG. 4 is a diagrammatic view of another condition in which the construction of a building may tend to result in soil shear failures; and FIG. 5 is a fragmentary view similar to FIG. 4 illustrating how the shear failure situation illustrated in FIG. 4 can be corrected.

The method of this invention is believed to be generally applicable for preventing or arresting landslides and soil shear failures of soil overlying a permeable sub-surface soil stratum which is substantially saturated with water and contains at least 10% by weight on a dry basis of montmorillonitic clay. More generally, the subsurface strata may contain from 10 to 70% by weight of montmorillonitic clay. Such subsurface layers will contain the clay in admixture with silt, sand gravel, etc. In the middle western part of the United States, typical weak montmorillonitic soil strata will contain from 20 to 40% clay by weight, and the method of the present invention is particularly applicable to such strata.

As previously indicated, the condition which the present invention is designed to correct arises most frequently where the subsurface montmorillonitic soil stratum overlies a relatively water-impermeable stratum. Such a stratum may be rock, shale, or a glacial till, which consists of a compacted mixture of gravel, sand, silt and clay. The exact character of the underlying stratum is not important in itself, except for the fact that the strata are relatively water-impermeable compared to the overlying montmorillonitic soil stratum and thereby tend to hold water in such stratum so as to maintain a perched water table, with consequent continuous saturation of the stratum.

In practicing the method of this invention, lime is introduced into the subsurface soil strata in an amount ranging from 0.3 to 9% by weight as calculated on a $Ca(OH)_2$ basis in relation to the dry weight of the soil in the subsurface stratum or the portion thereof being treated. The reason for specifying a $Ca(OH)_2$ basis is because lime can be used either as quicklime (CaO) or as hydrated lime, which is $Ca(OH)_2$. Quicklime is also sometimes referred to as unslaked lime, while hydrated lime is termed slaked lime. In addition to calcium oxide or hydroxide, some limes also contain magnesium oxide or hydroxide, which mixed limes, commonly referred to as dolomitic limes, can be employed in the present invention since it is believed that the primary active constituent is the calcium oxide or hydroxide, the range set forth above is on the CaO or $Ca(OH)_2$ basis. This will assure that the desired results are obtained, although the presence of the magnesium oxide or hydroxide may also contribute to the desired increase in the coefficient of friction, although not as effectively as the calcium oxide or hydroxide. Preferably, the lime treating agent is introduced into the subsurface soil strata in an amount ranging from 0.9 to 6% by weight on the indicated $Ca(OH)_2$ dry soil weight basis.

Since the lime is designed primarily to treat the montmorillonitic clay fraction of the soil, it may be desirable in some cases to calculate the amount of lime to be applied in relation to the clay content. For example, this procedure might be desirable when the soil contains an unusually high content of the clay. Where the clay content of the stratum is known or can readily be determined, it will be a simple mater to determine the amount of lime to be introduced into the stratum. When the stratum contains from 10–80% by weight of the montmorillonitic clay, from 0.1 to 5% of the lime can be introduced, the percentage being calculated on a $Ca(OH)_2$ basis in relation to the montmorillonitic clay content of the subsurface stratum. The preferred range is from 0.3 to 3% by weight of lime on a $Ca(OH)_2$-clay content weight basis.

The preferred sequence of steps for practicing the present invention consists of first locating the position and thickness of the subsurface soil stratum which is to be treated and making calculations of amount of lime required. Next, a series of vertically-extending, horizontally space-apart bore holes is formed so that the bore holes extend from the surface of the ground into the subsurface soil strata. These holes should extend substantially through the saturated zone, which comprises the slide or shear zone, and where there is an underlying water-impermeable strata, the bore holes should extend approximately to the depth of the upper portion of the water-impermeable stratum. After the bore holes have been formed, they are filled with lime at least up to the top of the saturated water zone or perched water table. The quantity of lime thus deposited within the subsurface montmorillonitic soil strata would be within the treating ranges previously specified.

Usually, the soil stratum to be treated will not lie at a depth of over 30 to 40 feet below the surface, and may even be within a few feet of the surface. Consequently, standard earth augers, such as truck-mounted augers, can be employed for forming the bore holes. The diameter of the bore holes is not critical, but typically may range from about 4 to 10 inches. The depth of the bore and the required number of bore holes have been previously determined by preliminary borings or probings. Such borings will determine the size, thickness and location of the subsurface stratum to be treated. As is well known in the earth boring art, it is relatively easy to locate the plane of transition from unsaturated aerated soil to that of saturated soil as found in a perched water table. This level will normally determine the upper boundary of the stratum to be treated. The lower boundary will be the plane of transition from the loose permeable soil material to the harder and relatively impermeable underlying material. It will also be relatively easy to locate this boundary, which will thereby permit the thickness of the stratum to be treated to be determined with sufficient exactness.

Once the thickness of the subsurface stratum to be treated is determined, it is a simple matter to calculate the volume of the stratum area which is to be stabilized. Where the percentage of the water in the stratum cannot be estimated with sufficient exactness, sample plugs or bores can be taken from the stratum, weighed wet, and then dry, to determine the percentage of water in the stratum, thereby permitting the weight of the stratum to be treated to be calculated on a dry basis. Once this figure is known, the percentage of lime to be introduced into the stratum can be readily calculated. Additional refinements can be to measure the amount of montmorillonitic clay and the free ions associated with the clay and gauge the amount of lime to the amount of clay, as put forth in Example 1. It is then only necessary to provide a sufficient number of bore holes distributed over the area to be treated so that the volume of the portion of the bore holes extending into the subsurface stratum will be sufficient to contain the amount of lime which it is desired to directly introduce into the stratum. In some instances, where the approximate location and condition of the subsurface stratum is known, it may not be necessary to utilize preliminary borings or probings, but instead the method can be practiced by forming the bore holes, and then proceeding to fill the holes with lime as previously described.

There is no particular objection to filling the bore holes with the lime to levels above that of the perched water table, although there will usually not be any great advantage in doing so. Diffusion of the lime will occur primarily in the zone of water saturation. Consequently, if the lime is introduced in the bore holes during a particularly dry season of the year, or if the holes are filled with lime to a level above that of the perched water table, or if the unslaked variety of lime is used, it may be desirable to introduce water into the bore holes to promote the diffusion of the lime. After the holes have been partially filled with the lime and water is introduced, if this is deemed desirable, the remainder of the bore holes should be filled with tamped earth or other available fill. This will protect the lime from contact with carbon dioxide in the air, which might cause the lime to convert to calcium carbonate, and thereby make it largely unavailable for the desired diffusion.

While the maximum benefit from the treatment varies considerably depending upon the particular conditions involved, treatment begins to produce the desired increase in strength within a few days, and appreciable improvement is obtained within two to three months. In some cases, as long as two or three years may be required to obtain the maximum improvement in the strength of the subsurface layer. While it is believed that the treatment will maintain the desired effect for a considerable period of time, up to several decades, it may subsequently become desirable to utilize a second treatment of the method of this invention.

The method of the invention is further illustrated in the accompanying drawings, to which a more detailed reference is now made. FIGURE 1 illustrates in diagrammatic cross section a hillside or slope site on which there has been erected a building 10. The upper portion of the ground consists of a permeable layer 11, into which extends the footing 12 of the building. Below the permeable layer 11 there is a stratum 13 of relatively water-impermeable material, such as shale or glacial till. The impermeable layer 13 slopes downwardly and may or may not follow generally the contour of the surface of the ground. Immediately above the impermeable stratum 13 is the stratum 14 which contains the perched water table, and is therefore saturated with water. Since the stratum 14 contains 24–35% by weight of montmorillonitic clay, it has very low frictional resistance. Rain, melting snow, and other ground water will penetrate the permeable layer 11, enter the stratum 14 and seep downwardly along the slope of the impermeable stratum 13. This will maintain or even augment the perched water table, so that the stratum 14 tends to remain in the zone of seepage and has very low shear strength. The weight of the building 10, combined with the weight of the soil 11, will tend to cause slippage of the building and the soil layers 11 on the saturated stratum 14. Possible shear or failure planes are indicated at 15, and by the similar curved arrow lines in FIGURE 1.

FIG. 2 illustrates the way in which the method of this invention would be applied to prevent or remedy the condition of FIG. 1. After the location and extent of the stratum 14 has been determined, a series of holes or borings 16 are formed so as to extend into and through the stratum 14 to the upper portion of the impermeable stratum 13. Lime is then introduced into the bore holes to provide a deposit of diffusable chemical at spaced locations within the stratum 14, as indicated at 17. The holes 16 are then filled with earth. The lime then begins to diffuse through the stratum 14, with a resultant increase in the coefficient of friction of the stratum, as previously explained.

FIG. 3 illustrates a typical pattern which might be employed for the bore hole 16. In the illustration given, the area to be treated is indicated by the rectangular broken line 17. The size of this area multiplied by the thickness of the stratum 14 will then give the volume of the stratum. From this can be calculated the dry weight which can be converted to the dry weight of the stratum, as determined by weighing wet and dry samples of the stratum. Usually, it will be desirable to distribute the bore holes as uniformly as possible, although obviously precision in spacing is not a necessity, and holes in particularly difficult or poorly accessible areas may be omitted, since the benefits from the treatment are cumulative over the entire area.

FIGS. 4 and 5 are similar respectively to FIGS. 1 and 2, except that they illustrate a condition where the surface soil layers and the subsurface strata are generally flat and extend horizontally rather than along a slope. For convenience of reference, similar elements of FIGS. 4 and 5 have been given the same numbers as those in FIGS. 1 and 2, except that the numbers have been increased by 100. The possibility of a serious soil shear failure or small scale landslide is greatly increased where the footings 112 of the building 110 are in the permeable soil layer or extend into the water table stratum 114 instead of being supported on the harder stratum 113. While such construction should be avoided, it does occur, and when the building has been completed with the footings at or near the water table stratum, there has heretofore been no readily available method satisfactory for correcting the situation except by hand excavation under the footings and either spreading the footings or transferring the load deeper by underpinning with pile. Grouting, or forcible intrusion of cementitious chemicals into the soil to harden it, is relatively ineffective in clayey soils because under pure mechanical force the chemicals fail to penetrate. The method of the present invention permits soil friction to be increased in the manner previously described by drilling the bore holes 116 and introducing the lime 117 within the water table area 114. The method differs from grouting in that the lime is commonly introduced as dry powder or granules rather than as a liquid, and it is not injected into the soil by pumping under pressure, but rather is poured loose into the holes 116, and disperses of its own from 117 by ionic diffusion.

EXAMPLE 1

The first step in application of this invention to a particular problem is to survey and test bore the problem area to determine or estimate: (i) depth and thickness of the failure stratum, (ii) moisture content, $m$, wet density $w$, and clay content $c$ of soil in this stratum, and (iii) extent of the failure area. These may readily be determined from observation of the ground surface and the structures affected, and from borings and samples. The moisture content, density, and clay content measurements are made by accepted standard procedures. If means such as X-ray diffraction are available, tests should be made to determine the mineralogy of the clay and the exchangeable cations. Otherwise these may be estimated, or a worst condition may be assumed.

Next, the weight of clay $c'$ per unit volume of the failing soil stratum is calculated. The following equations will assist in this calculation:

$$d = \frac{w}{1+\frac{m}{100}} \quad (1)$$

where $d$ is the dry density of the soil, ordinarily expressed in pounds per cubic foot, and $m$ and $w$ are as indicated above. The dry weight of clay per cubic foot of soil is:

$$c' = c \times d = \frac{cw}{1+\frac{m}{100}} \quad (2)$$

The percentage of lime to be added will depend on mineralogy and exchangeable cations present in the clay. If the clay is mainly montmorillonite and calcium is the dominant cation, about 3 percent lime by weight of the dry clay fraction will be needed; if other cations dominated, 6 percent lime or more will be required, because the other cations must be replaced by calcium before the beneficial reaction peculiar to the use of lime can fully proceed. In most soils involved at depth in landslides, the dominant cation in the shear zone is calcium. Indirect evidence which in many cases confirms this is the presence of free calcium carbonate in soil in the failure zone, or more rarely, presence of gypsum.

After a percentage level of treatment has been decided upon, the amount of lime required is expressed on the whole soil volume basis, in order that the bore hole diameters and spacing can be adjusted to introduce the correct amount of lime.

For purposes of illustration, numerical values can be assumed. Let the failure soil have a measured wet density of 130 p.c.f. and a measured moisture content of 42%. According to Equation 1 the dry density is $d = 91.5$ p.c.f. Furthermore if we assume a measured clay content of 35%, by Equation 2, the dry clay per unit volume of soil is $c' = 0.35 \times 91.5$ p.c.f. $= 32$ p.c.f. Now let us assume the clay is mainly calcium-saturated montmorillonite, and the desired treatment level is therefore 3%. The amount of lime required per unit volume of soil is 0.03 (32) = 0.96 p.c.f., or very nearly 1 pound of $Ca(OH)_2$ per cubic foot of soil, or the equivalence of CaO per cubic foot. (The latter equivalence may be calculated from the respective molecular weights of $Ca(OH)_2$ and CaO, and is 0.76 times the weight of $Ca(OH)_2$.) Next the bulk density of the lime must be measured; let us assume the lime used is to be pebble quicklime, with a bulk density of 76 p.c.f. The required volume of CaO per unit volume of soil in the failure zone is $$\frac{1 \text{ lb.Ca}(OH)_2}{1 \text{ c.f. soil}} \times \frac{0.76 \text{ lb. CaO}}{1 \text{ lb. Ca}(OH)_2} \times \frac{1 \text{ c.f. CaO}}{76 \text{ lb. CaO}} =$$

0.01 c.f. CaO/c.f. soil

The volume of the bored holes in the failure zone must therefore equal 1% of the total volume of soil in this zone. Ordinarily the bore hole diameter is fixed by the augering equipment available, and the spacing is adjusted to meet the calculated volume requirement, i.e., the required spacing is calculated from area of the hole compared to area of the square or hexagonal treatment area around the hole. Most efficient is use of a network of holes as shown in FIG. 3, in which case the treatment area around each hole is a hexagon, as shown in FIG. 3a. By principles of plane trigonometry the length of a side of each treated hexagon is $S/\sqrt{3}$, where S is the hole spacing, and the area of the hexagon is $$\frac{S^2}{2}\sqrt{3} = 0.866 \, S^2$$

The area of the bored hole is $$\frac{\pi}{4} D^2$$

where D is the diameter of the hole. In the example cited, $$\frac{\pi}{4} D^2 = 0.01 \, (0.866 \, S^2)$$

0.01 being the previously obtained volume ratio. If 6-inch diameter augers are available for the job, S found in this instance from the above equation is 4.77 feet.

Finally must be obtained the amount of lime and water put in each hole. This can be calculated from bore hole diameter and bulk density of the lime. A 6 inch diameter hole will have a volume per foot of length of

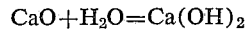

Multiplying this by the bulk density of the lime gives the pounds of lime per foot of treatment, in this case 0.197 (76) = 15 lb. If the shear zone is 3 feet thick, 45 lb. of lime will be poured in each hole. Since the lime in this example is CaO, sufficient water should be added slowly to hydrate the lime. From the hydration equation $$CaO + H_2O = Ca(OH)_2$$

and the respective molecular weights, the water added should be 32% of the weight of the CaO, or in the example cited, about 15 lb. or approximately 2 gallons. The remainder of the hole is then filled with soil to act as a seal. Holes through the shear zone and perched water table often contain free water; ordinarily this water should be pumped out prior to pouring in lime, or the later may not fall to proper depth in the hole.

EXAMPLE 2

The first successful application of this invention was to stop part of a landslide involving several houses in northern Des Moines, Iowa, in an area locally known as the 2800–2900 block on Aurora Avenue. Test borings showed that the slide was substantially as in FIG. 1, the upper (No. 11) material being a clayey fill composed mostly of re-deposited glacial till, and the lower (No. 13) material being a shale. The ground level at the back of the houses had lowered 5 to 8 feet, taking with it the garage or carport, and in some cases exposing the house footings. Structural damage to the houses was extensive, indicated by cracks in the basement floors and walls and warping of the upper stories. The shear zone at the base of the overlying (No. 11) material was found to be 2 to 3 feet thick, at a depth of about 10 to 15 feet.

Preliminary calculations per Example 1 showed that effective treatment should be possible with 6 inch holes spaced 5 feet apart, with 50 lbs. of ⅜ inch pebble quicklime and about 2 gallons of water per hole. Holes were drilled and filled as shown in FIG. 3, with the exception that adjacent to the houses the holes were filled their full length with the lime to further stabilize soil under the footings, as shown in FIG. 5.

Treatment of the lots containing two houses was completed in August, 1963, and various benchmarks and measurement devices were installed in the houses to show amounts of further movement. In October, 1963, about two months after treatment, three test borings were made at varying distances from one of the treatment holes, samples were obtained, and standard penetration tests were run. The samples were tested for moisture content and unconfined compressive strength.

The strength data are summarized in the table below:

| Distance from treatment hole | Standard penetration N, blows per foot | Moisture Content, Percent | Unconfined compressive strength, p.s.i. |
|---|---|---|---|
| 0'3" | 8 | 14.4 | 37 |
| 1'3" | 5 | 15.1 | 22 |
| 2'9" | 4 | 18.8 | 9 |

It may be seen that soil farthest from the treatment hole showed little or no improvement, whereas strength of soil near the treatment holes is increased several times. Also the moisture contents reflect the improved drainage of the affected soil, as expected. The above data represent an early state in the stabilization, and it is anticipated that lime diffusion and reaction will continue for many months or years, with continuing gradual improvement. Even in this early stage, calculations based on the above data indicate the factor of safety against sliding has been increased over 50 percent, which is a standard minimum for many soil embankment design purposes.

The benchmark measurement data verify that the treated portion of the landslide has stopped, and reveal an unexpected advantage which appears to accrue from the use of quicklime. Most of the cracks in the houses have closed slightly, of the order of 0.010" to 0.040", and an elevation benchmark indicates railing of one house by a total of about 0.020". It appears reasonable that expansion of the quicklime on hydration slightly densified the soil surrounding the houses, causing these readjustments.

EXAMPLE 3

A fairly typical illustration of slide conditions in naturally occurring soils is where shear zones are located in basal loess, within a foot or two of the contact with an underlying hard stratum. The loess is a non-compact, permeable, silty, montmorillonitic soil with low strength when saturated. It is therefore very weak in its basal part below the water table, and a frequent participant in landslides and shear failure.

Loessal landslides of the type shown in FIG. 1 are seen to occur in nature when a stream or gully removes soil from the toe of a slope. A similar situation occurs in roadcuts; the incidence of landslides in roadcuts through a loess area is often 30–80% or more, particularly if cuts are made through the saturated basal loess stratum. Just as excavations can cause landslides by overloading the toe, extra loadings as from buildings can cause landslides by overloading the head. The slide can then either be on a slope as in FIG. 1, or on level ground, FIG. 4.

An example of the situation in FIG. 4 is where, owing to improper design, building footings were located in the weak basal loess shear zone. In one such case investigated, settlement was locally as much as 3 inches and gave no indications of stopping. The remedy was to hand-auger a row of holes alongside the wall footings, pump the water out, pour in quicklime up to footing level, add water for hydration, and seal the holes with soil, as discussed in the previous examples. Slow dissolution and diffusion of lime through the saturated loess will increase soil strength and internal friction under the footing and prevent further shear and settlement.

While in the foregoing specification this invention has been described in relation to certain preferred embodiments thereof, and many details have been set forth for the purpose of illustration, it will be apparent to those skilled in the art that the invention is susceptible to additional embodiments and that many of the details described herein can be varied considerably without departing from the basic principles of the invention.

I claim:
1. In a method of stopping landslides and soil shear failures in soil above a laterally-extending, water-permeable sub-surface soil stratum which overlies a relatively water-impermeable stratum, said permeable soil stratum containing at least 10% by weight on a dry basis of montmorillonitic clay and being substantially saturated with water, thereby providing a perched water table which accentuates the tendency of said sub-surface soil stratum to form a shear zone, the sequence of steps comprising:
   locating the position and thickness of said sub-surface soil stratum;
   forming a series of vertically-extending, horizontally spaced-apart bore holes extending into said sub-surface soil stratum to approximately the depth of said water-impermeable stratum; and
   filling said holes with lime at least up to the top of said perched water table-containing soil stratum, the quantity of lime thus deposited in the portions of said holes within said sub-surface soil stratum being from 0.3 to 9% by weight as calculated on a $Ca(OH)_2$ basis in relation to dry weight of the soil in the portion of said sub-surface soil stratum covered by said bore holes.

2. The method steps of claim 1 in which said lime is introduced in an amount ranging from 0.9–6% by weight on said $Ca(OH)_2$-dry soil basis.

3. In a method of stopping landslides and soil shear failures in soil above a laterally-extending water-permeable sub-surface soil stratum which overlies a relatively water-impermeable statum, said permeable soil stratum containing from 10 to 80% by weight on a dry basis of montmorillonitic clay and being saturated with water, thereby providing a perched water table which accentuates the tendency of said sub-surface soil stratum to form a shear zone, the sequence of steps comprising:
   locating the position and thickness of said sub-surface soil stratum;
   forming a series of vertically-extending horizontally spaced-apart bore holes extending into said sub-surface soil startum to approximately the depth of said water-impermeable stratum; and
   filling said holes with lime at least up to the top of said perched water table-containing soil stratum, the quantity of lime thus deposited in the portions of said bore holes within said sub-surface soil stratum being from 0.1 to 5% by weight as calculated on a $Ca(OH)_2$ basis in relation to the dry weight of the montmorillonitic clay in the portion of said sub-surface soil stratum covered by said bore holes.

4. The method steps of claim 3 in which said lime is introduced in an amount ranging from 0.3 to 3% by weight on said $Ca(OH)_2$-montmorillonitic clay basis.

5. In a method of stopping landslides and soil shear failures in soil above a laterally-extending, water-permeable sub-surface soil stratum which overlies a relatively water-impermeable stratum, said permeable soil stratum containing at least 10% by weight on a dry basis of montmorillonitic clay and being substantially saturated with water, thereby providing a perched water table which accentuates the tendency of said sub-surface soil stratum to form a shear zone, the steps of:
   forming a series of vertically-extending, horizontally spaced-apart bore holes extending into said sub-surface soil stratum to approximately the depth of said water-impermeable stratum; and
   introducing lime into said holes at least up to the top of said perched water table-containing soil stratum, the quantity of lime thus deposited in the portions of said holes within said sub-surface soil stratum being from 0.3 to 9% by weight as calculated on a $Ca(OH)_2$ basis in relation to dry weight of the soil in the portion of said sub-surface soil stratum covered by said bore holes.

6. The method steps of claim 5 in which said lime is introduced in an amount ranging from 0.9 to 6% by weight on said $Ca(OH)_2$-dry soil basis.

References Cited by the Examiner
FOREIGN PATENTS 471,502   12/1935   Great Britain.
920,990   3/1963    Great Britain.

OTHER REFERENCES

Engr. News-Record (publ.) of Aug. 15, 1957, pages 101, 102 and 105.

CHARLES E. O'CONNELL, *Primary Examiner.*

JACOB SHAPIRO, *Examiner.*